(12) United States Patent
Stander et al.

(10) Patent No.: US 9,669,372 B2
(45) Date of Patent: Jun. 6, 2017

(54) PROCESS FOR LOADING CERAMIC SPHERES INTO A VERTICAL REACTOR

(71) Applicant: Petroval, Saint-Romain-de-Colbosc (FR)

(72) Inventors: Adriaan Stander, Fontenay (FR); Giuseppe Galassini, Le Havre (FR); Olivier Girard, Fourmetot (FR); Nicolas Aubin, Saint Laurent de Brevedent (FR)

(73) Assignee: Petroval, Saint-Romain-de-Colbosc (FR)

( * ) Notice: Subject to any disclaimer, the term of this patent is extended or adjusted under 35 U.S.C. 154(b) by 0 days.

(21) Appl. No.: 14/927,194

(22) Filed: Oct. 29, 2015

(65) Prior Publication Data

US 2016/0121288 A1 May 5, 2016

(30) Foreign Application Priority Data

Oct. 31, 2014 (EP) .................................. 143067494

(51) Int. Cl.
*B01J 8/00* (2006.01)
*B65G 69/16* (2006.01)

(52) U.S. Cl.
CPC ............. *B01J 8/0025* (2013.01); *B01J 8/003* (2013.01); *B65G 69/16* (2013.01); *B01J 2208/00752* (2013.01); *B01J 2208/00778* (2013.01)

(58) Field of Classification Search
CPC ... B01J 8/06; B01J 8/0025; B01J 2208/00769
See application file for complete search history.

(56) References Cited

U.S. PATENT DOCUMENTS

| 3,778,962 | A | 12/1973 | James | |
|---|---|---|---|---|
| 2011/0017348 | A1* | 1/2011 | Tanimoto | B01J 8/008 141/5 |
| 2015/0114516 | A1* | 4/2015 | Knubben | B01J 8/06 141/12 |
| 2015/0298085 | A1* | 10/2015 | Sanz | B01J 8/06 141/5 |

FOREIGN PATENT DOCUMENTS

| EP | 1939115 A3 | 8/2008 |
|---|---|---|
| EP | 2029463 A1 | 3/2009 |
| EP | 2191889 A1 | 6/2010 |
| EP | 2314371 A1 | 4/2011 |

(Continued)

OTHER PUBLICATIONS

European Search Report issued May 5, 2015 for Application No, 14306749.4.

*Primary Examiner* — Timothy L Maust
*Assistant Examiner* — Timothy P Kelly
(74) *Attorney, Agent, or Firm* — Saul Ewing LLP; Peter C. Lauro, Esq.

(57) ABSTRACT

The present invention provides a process for loading ceramic spheres into a vertical reactor. The process comprises introducing into the reactor along a substantial height thereof a feeding pipe that is opened at its bottom part. According to the invention, no physical device or air-supplying conduit is present inside the inner section of the feeding pipe. The process allows for rapid, safe and efficient loading, without breakage of the particles.

14 Claims, 1 Drawing Sheet

(56) References Cited

FOREIGN PATENT DOCUMENTS

| | | | |
|---|---|---|---|
| EP | 2868371 | A1 | 5/2015 |
| FR | 2829107 | A1 | 8/2001 |
| FR | 2996786 | A1 | 4/2014 |
| WO | 2005053833 | A1 | 6/2005 |
| WO | 2013160310 | A1 | 10/2013 |

* cited by examiner

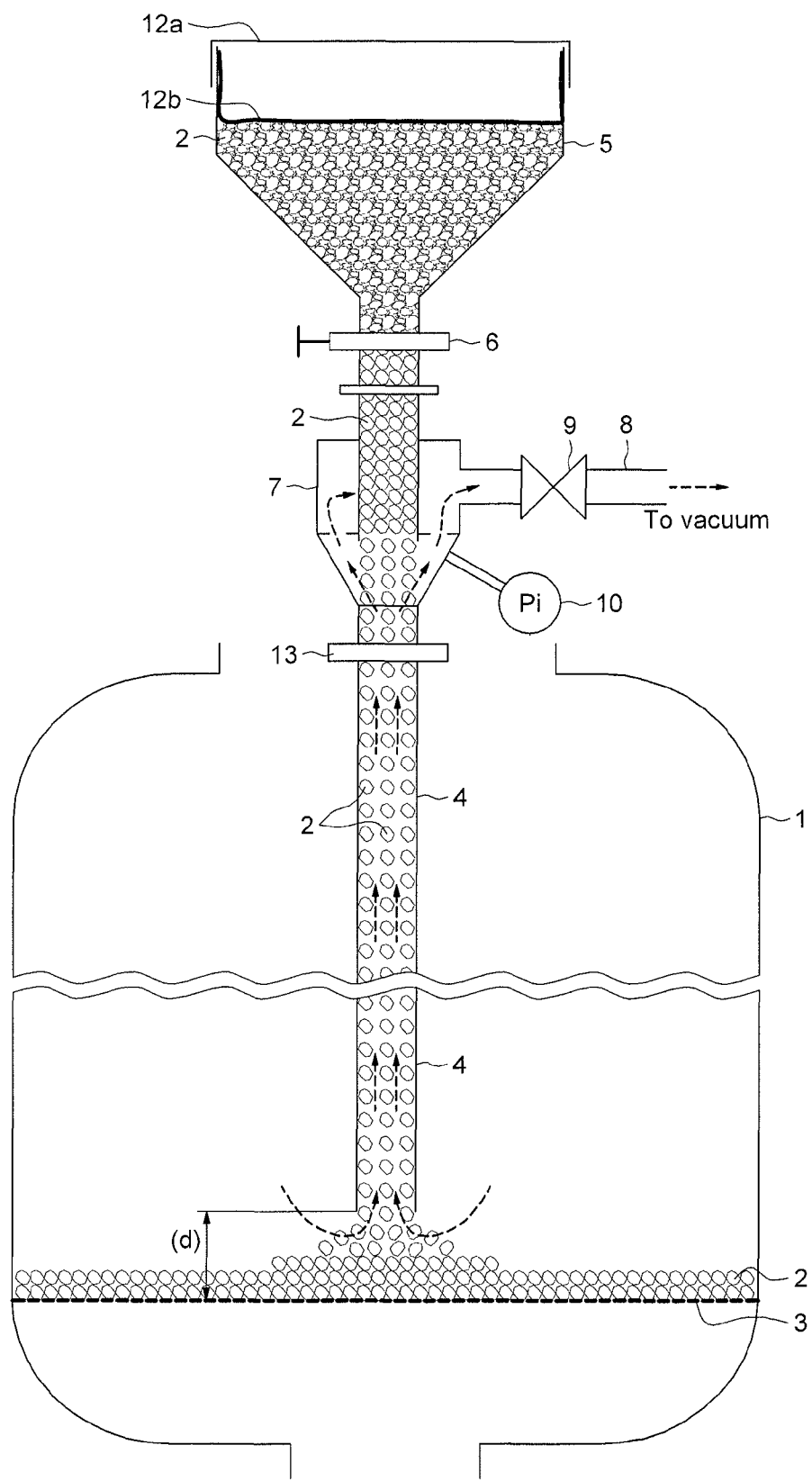

PROCESS FOR LOADING CERAMIC SPHERES INTO A VERTICAL REACTOR

CROSS-REFERENCE TO RELATED APPLICATION

This application claims priority under 35 U.S.C. §119(a) to European patent application No. 14306749.4, filed Oct. 31, 2014, the entire disclosure of which is incorporated herein by reference.

BACKGROUND OF THE INVENTION

Several refinery and petrochemical processes require that particulate material such as inert support particles be loaded into reactors, which are large vertical containers in which the hydrocarbon feeds are treated. The particles shall generally be loaded onto a grid or other mechanical support structure at the bottom of the reactor.

Representative examples or such processes are hydrotreating processes, which correspond to reactions carried out in the presence of hydrogen and which are generally intended to treat or remove undesirable compounds which are present in the hydrocarbon fractions, such as unsaturated hydrocarbons, sulphur-comprising, nitrogen-comprising, aromatic or metal compounds. Mention may be made, as non-limiting examples, of hydrogenation, hydrodesulphurization, hydrodenitrogenation, hydrocaromatization and hydrodemetallization of various types of hydrocarbon feeds (for example kerosene, gasoil, gasoline, atmospheric residue . . . ), which are used extensively in both the refining and petrochemical industries.

Such hydrotreating processes are performed in large reactors that contain a large quantity of granulate catalyst loaded as a single bed or as multiple beds. The reactors that are concerned by the present invention are those having an internal diameter of a least 0.5 m, such as an internal diameter ranging typically from 0.5 m to 5 m, more preferably from 2 to 5 m, and a height typically ranging from 2 m to more than 40 m.

Before loading the granulate catalyst used in these reactors, a first layer of particulate support material is generally loaded at the bottom of each catalyst bed, on a support grid or structure.

The support material is typically made of ceramic spherical particles (hereafter called ceramic spheres or ceramic balls), with typical diameters ranging from 6 mm to 25 mm.

When loading the support particles into on empty reactor, there are important considerations as regards the quality and the efficacy of the loading process, of which the three main ones are:

- The loading process must avoid breakage of the particles. Such breakage will in particular result in increased pressure drop during the reactor operation, which affects the performances of the process,
- The loading process must be as fast as practical. Extended downtime for catalyst changeout can result in very considerable financial penalties due to lost production.
- The loading process must ensure the safety of the personnel loading the material so that no particles or elements of the loading device may fall on the person operating the loading device inside the vessel.

Achieving all these objectives poses a severe practical problem when performing a loading operation. Simply pouring the particles from the top of the reactor will result in each particle accelerating under the force of gravity and gaining in vertical falling velocity over the height of the reactor. Taking into account the high height of the reactors, this will result in an unacceptably high impact velocity in the bottom of the reactor, either onto the bottom support structure in the case of an empty reactor, or onto the surface of the bed of particles in the case of a partially loaded reactor.

This problem is especially important for the loading of the support material. Indeed, the support material particles have a particularly large size, and need to be loaded at the very bottom of the reactor, which means that they are submitted to a particularly high fall height. Should such large and heavy particles simply be poured into vessel from the top opening, their very high impact velocity when reaching the bottom will result in significant breakage.

The initial concept for avoiding the high velocity impact from free falling was to lower down into the reactor, by means of a rope or a cable, discreet small quantities of particulate material enclosed within a container such as a bag or a bucket. The material is only discharged once the container has reached the bottom.

While these methods achieved the objective of avoiding free fall of the particles, they were still inefficient with respect to duration of loading and safety of operating people inside the vessel.

The next concept for the loading of particulate material into a vessel involved using a sock connected to a hopper for feeding the particulate material from the top of the vessel. This sock can be used in two different ways: either by twisting the sock to slow down the particles by friction all along the sock wall. The support material can then be loaded at a low rate. Or the sock can be twisted tight before opening the hopper and untwisted slowly with the hopper valve open. In this way, the sock is filled slowly from the top to the bottom. The loading rate is then controlled manually by the operator. The major drawback of the first method is to control the opening of the sock and the hopper simultaneously to avoid breakage. The drawback of the second method is the safety of the operator who is located inside the vessel. A sock filled with particulate material can become very heavy and the structural integrity of the sock becomes constrained. Severe injuries are reported every year due to the rupture or collapse of a filled loading sock.

Further innovation in particulate material loading techniques introduced mechanical means into the container to reduce the fall velocity.

Under this concept, a flexible tube formed into large S shaped bends is used and bended all along the height of the container. With this arrangement, the particles no longer fall freely down the sock, but slide along the inclined parts of the S shapes, thus experiencing some decelerating resistance. Such a technique is for example disclosed in FR 2 829 107.

EP1939115 describes a series of helicoidal devices inserted inside a sock and attached to the top hopper over substantially its entire length. These devices create a physical obstruction to the falling particles. The particulate material is poured into the top hopper and the flow of particles is manually regulated through a valve opening, but before the particles can reach a too high falling velocity, they encounter and impact on these physical obstructions. In this fashion, the falling velocity is reduced, in a stage-wise fashion, over the entire length.

These methods represent a significant improvement over the previously used processes, notable with respect to loading quality, speed and safety, but they still have some drawbacks.

A main drawback is that the particles physically impact onto the obstructions of the decelerating device, with a substantial risk of breakage of both the device and the particles.

The latest innovation is described in EP 2 029 463 which discloses a rigid pipe fixed on the top flange of the container. This pipe is equipped with a piston which is controlled by an air driven winch. This piston, starting from the top of the pipe is slowly lowered down inside the pipe while the top hopper valve is open. The pipe is filled from the top to the bottom in a secured manner. By virtue of being constructed from steel or stainless steel, this device is capable of supporting the very considerable weight of the filled pipe without rupturing or collapsing as is the case for flexible loading socks. However, this concept requires heavy hoisting equipment to lift the pipe and some special arrangements must be made on the top platform to install all the needed equipment (hopper, winches, safety equipment).

SUMMARY OF THE INVENTION

The present invention provides a process for loading ceramic spherical particles into a vertical reactor. The process of the present invention is particularly suitable for loading fragile ceramic particles that are likely to break into the bottom of a high container. In particular, the process of the invention allows loading ceramic balls into a vertically orientated reactor, such as for example those found in refinery and petrochemical processes.

The present invention aims at providing an improved process, which allows the loading of ceramic spheres into a large vertical reactor, and overcomes the drawbacks of the processes of the prior art.

The present invention therefore concerns a process for loading ceramic spheres having a diameter ranging from 6 mm to 25 mm into a vertical reactor having a diameter of at least 0.5 m, which comprises:
  introducing into the reactor along a substantial height thereof a feeding pipe that is opened at its bottom part, said feeding pipe being vertical or having an angle of inclination with regard to vertical of at most 15 degrees,
  inducing an upflow of air and/or nitrogen into said pipe from the bottom opening to the top thereof by sucking air from the top of the feeding pipe (4) using a vacuum system, and
  pouring said ceramic spheres into the pipe from the upper part thereof in such a way that said spheres falls down inside the said pipe, counter currently to said upflow of air and/or nitrogen, characterized in that no physical device or air-supplying conduit is present inside the inner section of the feeding pipe.

BRIEF DESCRIPTION OF THE DRAWINGS

FIG. 1 shows a vertical large reactor 1 that is opened on its top part, into which a support material made of ceramic balls 2 needs to be loaded, onto support grid 3 in the bottom of the reactor.

DETAILED DESCRIPTION OF THE INVENTION

The process of the invention will be hereafter described and illustrated with regard to its use in the refinery and petrochemical fields. However it will be clear for those skilled in the art that it can be directly implemented in any other technical field where ceramic particles that are likely to be broken need to be loaded into a high vertical reactor.

According to the invention, the particles are loaded into the bottom of the reactor via a substantially vertical feeding pipe that is inserted into the reactor. Preferably, said feeding pipe is vertical or has an angle of inclination with regard to vertical of at most 10 degrees. According to the invention, the feeding pipe is advantageously rigid or semi-rigid. Rigid means a metallic pipe and semi-rigid means a rubber or plastic tube with steel reinforcing.

According to a preferred embodiment, the feeding pipe is straight over its whole length.

An ascendant flow of air is created inside the pipe from the bottom to the top thereof, which slows down the falling particles to a velocity that is low enough to avoid any breakage thereof at the moment of impact at the bottom of the reactor or at the surface of the bed of particles for a partially loaded reactor.

By regulating the velocity of the upflow of air and/or nitrogen into the pipe, the drag force on the particles falling inside the pipe can be controlled over the entire length of the pipe and up to the exit thereof.

According to the present invention, no physical device or air-supplying conduit is present inside the inner section of the feeding pipe during the loading operations, neither for physically slowing down the falling particles nor for supplying air into the pipe nor for any other purpose such as controlling the loading level or rate. The present invention thus allows overcoming other drawbacks of some processes disclosed in the prior art.

In particular, the absence of any physical device inside the feeding pipe avoids the risk of blockage during loading, which can exist due to the reduced cross-sectional diameter of the feeding pipe. Thus, the present invention allows for a significantly increased loading rate, with a corresponding reduction in the overall loading duration.

The feeding pipe should be inserted into the reactor deeply enough, so that the distance between the exit of the pipe and the bottom of the reactor or the top of the particles bed is low enough to avoid any substantial breakage of the particles. In other terms, when the particles exit the pipe, the remaining height along which the particles fall freely should be as low as possible. Lowering as much as possible such remaining height allows one to eliminate almost all risks of breakage of the particles.

Of course, the maximum remaining height that should be allowed depends largely on the amount of free space required to perform the other activities associated with the loading support materials, such as spreading out and levelling off the layer of support material.

In a general manner, according to a preferred embodiment the feeding pipe is introduced into the reactor so that the distance between the lower exit of the pipe and the bottom of the reactor or the top of the bed of ceramic spheres in the case of a partially loaded reactor is at most 2 m, more preferably at most 1 m.

A main benefit of the process of the invention is that it allows to control and to reduce as much as desired the net downwards velocity of the falling particles relative to the container. It therefore allows to substantially reduce the impact velocity of the particles when they reach the bottom of the reactor, which reduces the risk or breakage.

Furthermore, the process is simple and allows a fast and efficient loading of ceramic balls into very high reactors.

A substantial advantage of the process of the invention is its very good safety for the personnel performing the loading operations, inside the reactor. In some instances, it may even be possible to perform the loading of the ceramic balls without anybody inside the reactor, and only send personnel inside at the end of the operation to perform the final actions such as levelling off the layer.

Another advantage of the process over those used in the prior art is that the air flowing up into the feeding pipe will remove any dust or small pieces, typically referred to as chips, that are present in the ceramic balls as delivered. The air/nitrogen that is sucked into the feeding pipe at its bottom end will also remove some of the dust that is generated as the balls are loaded into the reactor. The combination of these two effects will result in a substantial reduction of dust inside the reactor during the loading process, which is beneficial from a safety and comfort viewpoint for the person or persons working inside the reactor during the loading process.

According to the invention, the impact velocity of the ceramic spheres is advantageously controlled at a value that reduces breakage thereof, and more preferably that totally avoids breakage.

According to a preferred embodiment, the impact velocity of the spheres is controlled so that it remains at a mean value below 10 m/s, and preferably below 6 m/s.

The value of the impact velocity of a falling particle is the value of the falling velocity achieved by said particle when it reaches either the bottom of the reactor or the top of the bed of particles already loaded. The velocity hereabove is expressed relative to the reactor.

The mean impact velocity of the balls is controlled by controlling the mean net velocity of the balls with regard to the reactor at the exit of the feeding pipe.

To obtain the required mean net velocity of the ceramic spheres at the exit of the feeding pipe, one must control the upflow rate of air (and/or nitrogen). The rate of upflowing air required to obtain a particular net velocity can be calculated. It depends in particular on the dimensions of the feeding pipe, specifically its inside diameter and its length; the aerodynamic characteristics of the particles; and the conditions of the upflowing air/nitrogen, specifically the pressure and temperature. Typically, the velocity of the upflowing air and/or nitrogen shall be at least 20 m·s−1.

According to the invention, the upflow of air and/or nitrogen is induced by sucking air from the top of the feeding pipe using a vacuum system. This requires that a vacuuming system be connected to the upper part of the feeding pipe.

In this case, the rate of upflowing air/nitrogen is controlled by controlling the amount of air that is allowed to flow to the vacuum system.

The system used for pouring the ceramic spheres at the top of the feeding pipe can be any conventional one, provided that it allows controlling the flow rate of particles supplied to the pipe. This control of the particle flow rate does not need to be precise, as long as it is able to limit the flow rate to a value where the system does not become overloaded. For example, a slide valve such as typically used in this service will be sufficient.

According to the invention, the reactor advantageously remains opened at its top part during the loading process. It means that the top exit of the reactor is not sealed.

Furthermore, in the present invention no additional pipe or conduit is introduced into the reactor to introduce air and/or nitrogen into the reactor. The air that is being sucked out of the reactor is being replenished by air being drawn in through the open top exit of the reactor.

The process of the present invention can be used in all technical fields, in all cases in which at least one vertical reactor of significant height needs to be filled with ceramic balls that are likely to be broken due to impact on a hard surface under conditions of gravitational free fall.

By "significant height", it is meant a reactor having an internal height ranging from 5 to 40 m, or even higher (such as for example up to 60 m).

The process is particularly suitable for loading ceramic balls used as support material into the bottom of a reactor in the fields of (petro) chemistry and petroleum refining.

Hence, according to a preferred embodiment, said reactor is a vertical reactor used in a chemical, petrochemical or petroleum refining process.

The invention will now be further illustrated in a non limitative embodiment, with reference to FIG. 1 which illustrates a preferred example of implementation of the process of the invention, in the case of loading ceramic balls into the bottom of a large vertical reactor such as a hydrotreating reactor.

In particular, FIG. 1, shows a vertical large reactor 1 that is opened on its top part, into which a support material made of ceramic balls 2 needs to be loaded, onto support grid 3 in the bottom of the reactor. According to the invention, a vertical feeding pipe 4 that is open at its bottom has been introduced into reactor 1, along a substantial height thereof, so that the distance (d) between the lower exit of pipe 4 and grid 3 is less than 2 m.

A suitably powered vacuum system not shown sucks air from the top of feeding pipe 4 via chamber 7 and conduit 8, thereby creating an ascendant flow of air and/or nitrogen from the bottom to the top of pipe 4, which is shown by the bold dotted arrows.

The air/nitrogen is sucked from the interior of reactor 1, enters at the bottom of the pipe 4, and flow from the bottom to the top of pipe 4. The air that is sucked from the interior is replenished by air flowing in through the open top exit.

Prior to introducing the ceramic balls, an upflow of air is established inside pipe 4 and set to an appropriate value, as determined from experience, taking into account the diameter of the pipe 4 and the size and weight of the ceramic balls. The air flow rate is set by adjusting the manual control valve 9 to obtain the required upflow air velocity inside pipe 4.

This upflow air/nitrogen velocity will typically be measured by measuring the velocity of the air/nitrogen entering the bottom open end of pipe 4, by means of a device such as a handheld anemometer. Once a satisfactory air flow rate is achieved, as determined by the anemometer reading, the reading on the vacuum gauge 10 is noted for future reference during the loading operation.

Once the air flow rate is established, the ceramic balls 2 to be loaded onto grid 3 are poured into pipe 4 at the upper part thereof. They are fed from the particles supply hopper 5, through a particles flow control device 6 and then via chamber 7 which is attached to pipe 4 via sealing clamp 13.

The particles flow control device 6 is manually set to give the appropriate supply rate of balls 2.

As shown on the FIGURE, the ceramic balls 2 are loaded onto grid 3 via feeding pipe 4, in which they fall downwardly counter currently to the upflow of air and/or nitrogen.

The upflow of air/nitrogen slows down the falling ceramic balls 2 to a velocity that is low enough to avoid any breakage thereof when they reach the bottom of reactor 1.

It is possible that, once the ceramic balls are introduced into pipe 4, the previously established air flow rate may be affected. In this case, the manual flow control valve 9 can be adjusted by making reference to the previously noted reading on vacuum gauge 10.

In addition, visual observation of the ceramic balls as they exit pipe 4 and impact in the bottom of the vessel may dictate further minor adjustments to the manual flow control valve 9.

During the loading operation, the supply hopper 5 should be properly sealed at the top to avoid excessive ingress of air. Such sealing does not need to be perfectly air-tight, and can for instance be done with a lid 12a. An alternative is to cover the top surface of the ceramic balls inside the hopper with a tarpaulin or fire blanket 12b which extends up to the side walls of said hopper.

Using the device disclosed in FIG. 1, the support material made of ceramic balls 2 is loaded into reactor 1 in a safe and efficient manner, without breakage thereof.

Of course, the process of the present invention can be implemented in vertical reactors of all types and configurations, and one skilled in the art can easily accommodate the particular device arrangement to match all types of particular configurations.

The invention claimed is:

1. A process for loading ceramic spheres having a diameter ranging from 6 mm to 25 mm into a vertical reactor having a top and a bottom and an internal diameter of at least 0.5 m, which comprises:
   introducing into the reactor along a height thereof a feeding pipe having a top and a bottom that is opened to form a lower exit, so that a distance (d) between the lower exit of the feeding pipe and the bottom of the reactor or a top of a bed of ceramic spheres, in the case of a partially loaded reactor, is at most 2 m, said feeding pipe being vertical or having an angle of inclination with regard to vertical of at most 15 degrees;
   inducing an up flow of air and/or nitrogen into said feeding pipe from the bottom opening to the top thereof by sucking air from the top of the feeding pipe using a vacuum system; and
   pouring said ceramic spheres into the pipe at the upper part thereof in such a way that said spheres fall downwardly counter currently to said up flow of air and/or nitrogen,
   wherein no physical device or air-supplying conduit is present inside the feeding pipe.

2. The process of the claim 1, wherein a rate of up flowing air and/or nitrogen is controlled by adjusting an amount of air and/or nitrogen that is allowed to flow to the vacuum system.

3. The process of claim 1, wherein said feeding pipe is vertical or has an angle of inclination with regard to vertical of at most 10 degrees.

4. The process of claim 1, wherein said feeding pipe is straight over its whole length.

5. The process of claim 1, wherein impact velocity of the spheres is monitored so that it remains at a mean value that is less than 10 m/s.

6. The process of claim 1, wherein mean net velocity of the spheres at the lower exit of the feeding pipe is controlled by controlling the rate of up flowing air and/or nitrogen.

7. The process of claim 1, wherein the distance (d) is at most 1 m.

8. The process of claim 1, wherein the reactor has an internal height ranging from 5 to 40 m.

9. The process of claim 1, wherein the feeding pipe is rigid or semi-rigid.

10. The process of claim 1, wherein the internal diameter of the reactor ranges from 0.5 m to 5 m.

11. The process of claim 10, wherein the wherein the internal diameter of the reactor ranges from 2 m to 5 m.

12. The process of claim 1, wherein the reactor is used in a petrochemical or petroleum refining process.

13. The process of claim 1, wherein impact velocity of the spheres remains less than 6 m/s.

14. The process of claim 1, wherein the reactor has an internal height that is greater than 40 m.

* * * * *